MACHINE TOOL FOR REMOVING PRODUCT FROM A CONTAINER

Robert K. Sedgwick, Waukesha, Wis., assignor to Kearney & Trecker Corporation, West Allis, Wis., a corporation of Wisconsin Application March 19, 1956, Serial No. 572,438

17 Claims. (Cl. 15—104.1)

This invention relates generally to machine tools, and more particularly to a milling machine especially adapted to remove material from a cylindrical container.

In extracting titanium metal from the ore, the reduction process yields the refined metal in a very porous mass termed "sponge" which is contained in crucibles or containers. The containers containing the molten metal are set aside to cool to allow the sponge to form and in cooling, the portion of the metal adjacent to the walls of the containers absorbs impurities and is unsatisfactory for use as titanium metal. The pure titanium sponge is the raw material which is processed into its ultimate form, and which is removed from the container by chipping or by machining it out, to reduce it to particles. In this operation the container is usually positioned in a downwardly facing position so that when a cutting tool is engaged in operating upon the sponge therein, the particles produced will tend to fall out of the container. This positioning of the container in such relationship to the cutting tool is a time consuming operation requiring a number of attendants for guiding and controlling the container as it is placed into position and for securing the container in the desired position. Titanium is an extremely reactive metal at elevated temperatures and the heat generated in the machining operation may have an adverse effect on it and it is therefore desirable to perform the machining operation in the presence of an inert gas such as argon. Also, the particles produced in the machining operation will have a relatively large porous area which facilitates oxidizing of the particles upon contact with the atmosphere. Upon oxidizing the titanium increases in hardness which is undesirable. Thus, it is desirable to conduct the particles, as they are machined out of the container, into a suitable receptacle from which the atmosphere is excluded.

It is therefore a general object of this invention to provide an improved machine tool especially adapted to remove a mass of material from a cylindrical container.

Another object of this invention is to provide a milling machine particularly adapted to operate upon solidified metal in a container to remove the metal therefrom in the form of particles having porous surfaces.

Another object of this invention is to provide a milling machine capable of receiving and clamping a container in position while its contents are being operated upon by a cutter.

Another object of this invention is to provide a milling machine having means for positioning a container from a load position to a work position.

Another object of this invention is to provide a milling machine capable of positioning a container into a predetermined desired location in relation to a work tool.

Another object of this invention is to provide a milling machine capable of positioning a container in a downwardly facing position.

Another object of this invention is to provide a milling machine capable of positioning a container in a work position and locking the container in that position while it is being rotated.

Still another object of this invention is to provide a milling machine arranged to perform a machining operation within an enclosure from which the atmosphere has been excluded.

Another object of this invention is to provide a milling machine for removing a mass of material from a container in the form of particles and having means for conducting the particles to a suitable container without exposing them to the atmosphere.

Yet another object of this invention is to provide a locking mechanism capable of locking a container positioning member in a work position.

Another object of this invention is to provide a locking mechanism which is effective in securing a work positioning member in a work position and also effective to exert a force upon the positioning member in the secured position.

According to this invention there is provided an improved milling machine arranged for the specific purpose of machining refined titanium sponge out of crucibles in which it is contained. The machine is adapted to handle the crucible from a load position to a work position and maintain the crucible in sealed frictional engagement with a ring, which rotates the crucible while a spindle feeds a rotating cutter into the crucible to remove the material therein. It comprises a base upon which a cutter carrying spindle is rotatably supported and also carried thereon for axial movement. The axis of the spindle is inclined upwardly from the horizontal, so that axial movement of the spindle will serve to feed the cutter upwardly at an angle with respect to the horizontal. At the opposite end of the base there is provided a basket pivotally connected to the base which is adapted to receive a holder in which the crucible containing the titanium sponge is secured. The basket is normally disposed in a vertical position with its open end up for the loading of the holder therein. The basket is movable from the load position through the horizontal plane to a downwardly facing work position wherein the axis of the basket is parallel to the axis of the spindle and its open end faces the cutter so that the cutter may be fed into it for operating upon the contents of the crucible which is secured in the basket. Between the basket and the spindle, the base rotatably supports a ring adapted to receive the holder and crucible, as a unit, when the basket has been placed in the work position. The holder and ring are so constructed as to provide for sealed engagement as well as frictional engagement between them. Positive means are provided to secure the basket in the work position and which also functions to insure positive sealing and frictional engagement of the holder with the ring. The ring is disposed at an angle corresponding to the angle of the spindle so that the axis of the ring is parallel with the axis of the spindle. Closure means have been provided to encase the spindle side of the ring so that the cutter when operating on the material within the crucible will operate in a sealed enclosure from which the atmosphere has been excluded. To effect the machining operation, the ring is rotated by power to rotate the holder and thereby the crucible, relative to the cutter, the latter being rotated about its axis while the spindle is moved axially to feed the cutter into the crucible to operate on the titanium sponge contained therein. The rotation of the crucible causes the cutter to cut in a circular path, removing pieces of titanium from the mass as the crucible is rotated and the revolving cutter is fed inwardly into the crucible. Since the diameter of the cutter overlaps the axis of rotation of the crucible, the action of the cutter actually bores a large hole in the mass of titanium sponge, leaving a layer of titanium sponge adjacent to the wall of the crucible, which is that portion of the titanium sponge containing the impurities. After the titanium sponge has been removed from the crucible, rotation of the ring is stopped and the cutter withdrawn from the crucible. Thereupon the basket is released and actuated to the load position. As the basket is being lowered, the upper wall portion of the basket will contact the holder to withdraw the holder from the ring drive. The holder then will drop into the basket and be moved to the load position where it can be removed by suitable means, such as a crane. Means have been provided whereby the cutter enclosure, the material chute and the material receptable may be charged with an inert gas such as argon.

The foregoing and other objects of this invention, which will become more fully apparent from the following detailed description, may be achieved by the particular illustrative machine tool depicted in and described in connection with the accompanying drawings, in which:

Fig. 3 is an enlarged fragmentary view, substantially in vertical section through the ring, with the titanium sponge carrying crucible and the holder therefor engaged therein;

Fig. 5 is an enlarged fragmentary view substantially in horizontal section taken through the basket locking mechanism illustrated in Fig. 3; and, Fig. 6 is an enlarged fragmentary view in side elevation depicting the locking mechanism illustrated in Fig. 5, showing the various positions of the several operating members at different stages of operation.

Figure 1:
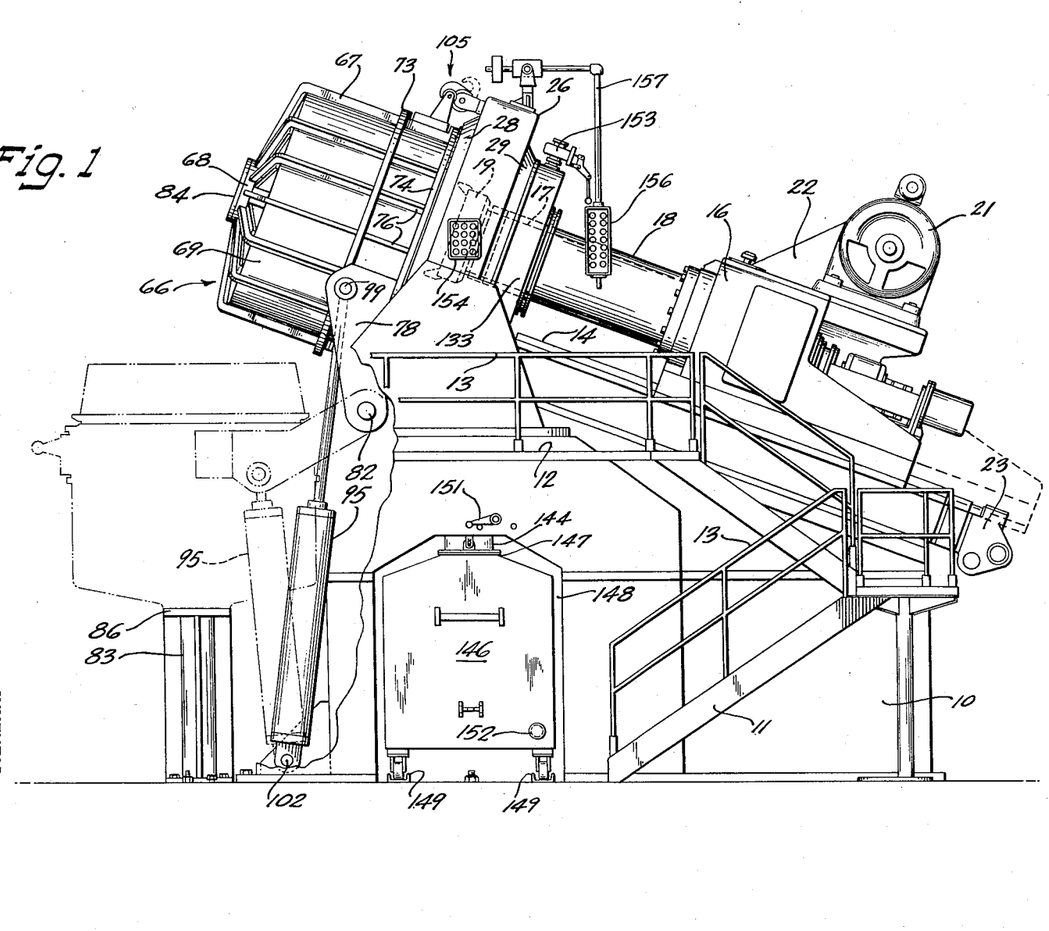
Figure 1 is a view in side elevation of a machine tool incorporating the novel features of the present invention.

Reference is now made to the drawings, and specifically to Fig. 1 thereof showing a machine tool, comprising essentially a base 10 having stairs 11 leading to a platform 12 on which an operator stands in operating the machine. A guard rail 13 extends along the stairs 11 and platform 12 for the safety of the operator.

A set of ways 14 is formed on the rearward portion of the base 10 for engagement with cooperating ways (not shown) formed on the underside of a spindle head 16 for slidably supporting the spindle head 16 on the base 10. The spindle head 16 rotatably supports a spindle 17 which extends through a quill 18 secured at one end to the spindle head 16. At its extending end the spindle 17 supports a cutter 19 exteriorly of the quill 18. The spindle 17 is rotated by power obtained from an electric motor 21 mounted on top of the spindle head 16. The power is transmitted from the motor 21 through a belt transmission 22 to the spindle 17 to rotate it and its associated cutter 19.

As previously mentioned, the spindle head 16 is slidably mounted on the ways 14 to effect axial feeding movement of the cutter 19. The spindle head 16 is movable on the ways 14 to a full retracted position, represented by the broken lines in Fig. 1, which is the tool change or service position. However, for a normal operation the spindle head 16 is moved between a full advance position to a normal retracted position. A motor 23 is mounted on the lower rear portion of the base 10 to rotate a lead screw (not shown) for actuating the spindle head 16 in its path of movement at a preselected uniform rate. It is to be noted that any other means may be used for actuating the spindle head 16, such as the well known piston and cylinder mechanism operated by hydraulic pressure.

The ways 14 are disposed at an angle to the horizontal as shown in Fig. 1, sloping upwardly from the rear of the machine. The spindle 17 is supported with its axis at the same angle relative to the horizontal, parallel to the ways 14, so that when the spindle head 16 is moved forwardly from the rear of the machine, the spindle 17 and its associated cutter 19 will be moving upwardly at the same time that they are moving forwardly. The purpose of this arrangement will become apparent from the description that follows.

Figures 3, 5, 6:
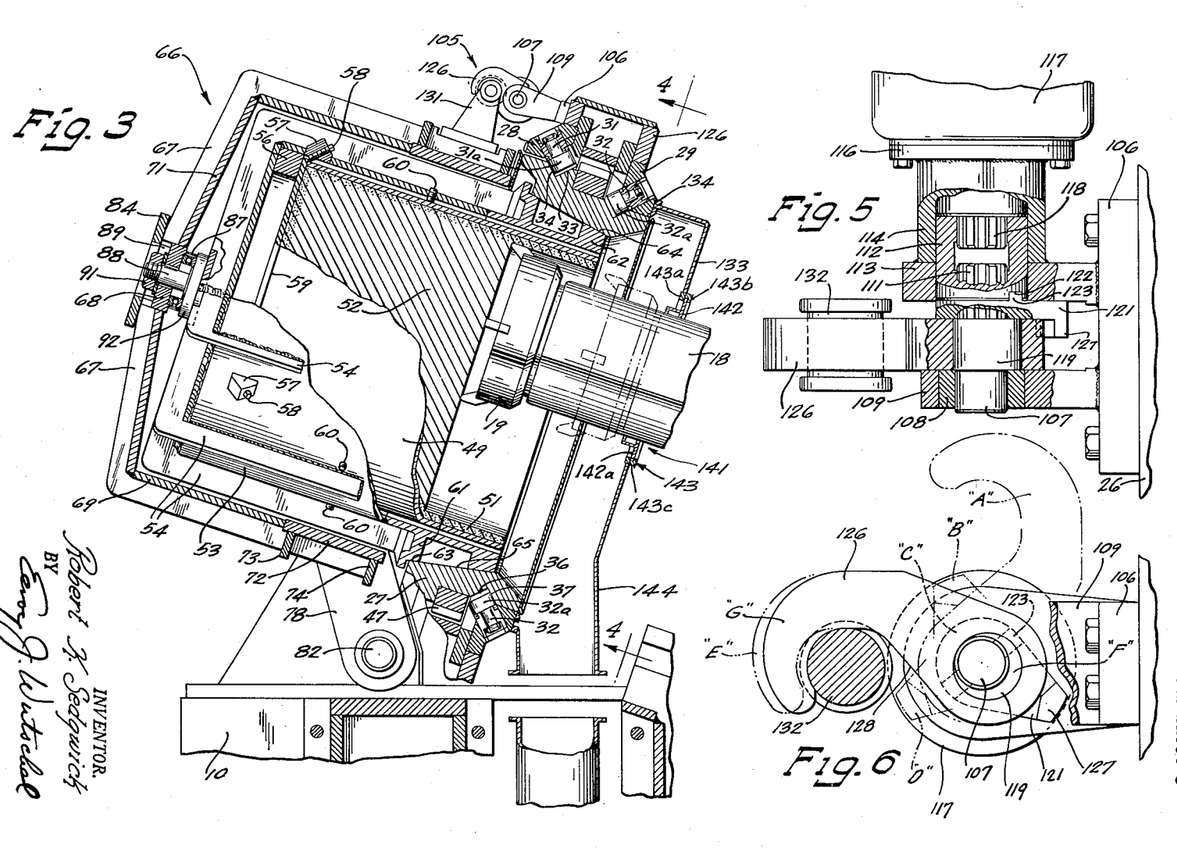
Figure 4:
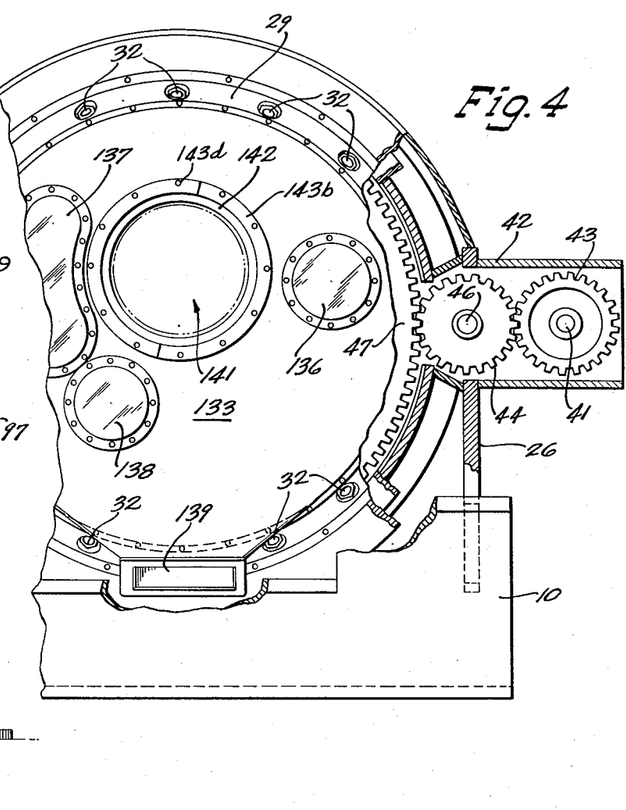
Fig. 4 is an enlarged fragmentary view partly in rear elevation and partly in section through the ring taken along the plane represented by line 4—4 in Fig. 3, showing the driving connection for the ring.

Towards the forward end of the base 10 there is rigidly supported an upstanding housing 26 mounted at an angle corresponding to the angle of the spindle 17 so that the axis of the housing 26 is parallel with the axis of the spindle 17. As seen in Figs. 3 and 4, the housing 26 functions to rotatably support a container receiving ring 27. To this end, the housing 26 has secured to its end faces a pair of annular rings 28 and 29 each of which rotatably supports a plurality of stub shafts 31 and 32, respectively, that are equally spaced about the rings 28 and 29. The shafts 31 and 32 have rollers 31a and 32a secured to their inner extending ends. The rollers 31a of the ring 28 are mounted in a circle about the ring 27, with each roller having its axis located 45° from the axis of rotation of the ring 27. In a similar manner, the rollers 32a of the ring 29 are disposed in a circle, with each having its axis located 45° from the axis of the ring 27, but 90° from the axis of the rollers 31a. The rollers 31a cooperate with an annular groove 33 of V-shaped cross-section, formed in the periphery of the ring 27. The V-shaped groove 33 presents an annular bearing surface 34 which is disposed to cooperate with the peripheral surfaces of the rollers 31a. Likewise, the rollers 32a cooperate with an annular groove 36, of V-shaped cross-section, also formed in the periphery of the ring 27. The V-shaped groove 36 also presents an annular bearing surface 37 which is disposed to cooperate with the peripheral surfaces of the rollers 32a. In operation, the rollers 31a are disposed within the V-shaped groove 33 and their peripheries roll along the bearing surface 34. Likewise, the rollers 32a are disposed within the V-shaped groove 36 and their peripheries roll upon the surface 37. It is obvious therefore, that the two sets of rollers 31a and 32a cooperate with the annular bearing surfaces 34 and 37, respectively, to rotatably support the ring 27 within the housing 26, and also function to prevent axial movement of the ring 27.

Power for rotating the ring 27 is obtained from a hydraulic motor (not shown) connected to drive a shaft 41 journalled in a gear case 42 secured to the side of the housing 26, as best shown in Fig. 4. A driving gear 43 is keyed to the end of the shaft 41 in position to mesh with an idler gear 44 secured to a jack shaft 46 journalled in the gear case 42. The idler gear 44 is disposed to mesh with a ring gear 47 secured to the periphery of the ring 27 on a reduced portion thereof. Therefore, as the driving gear 43 is rotated by the shaft 41 the idler gear 44 is rotated to effect rotation of the cooperating ring gear 47 and the associated ring 27 at a reduced rate.

As previously mentioned, the machine shown in the drawings is especially adapted for removing a mass of titanium sponge from the container in which it is contained. The ring 27 serves to receive the container with the titanium sponge contained therein, and rotate the container, with its contents, relative to the cutter 19 for effecting a feeding movement of the titanium sponge to the cutter 19 in a circular path. In Fig. 3, a container 49 is shown in position within the ring 27 and partially broken away to reveal its contents. It will be noted that the view in Fig. 3 illustrates two compositions of titanium sponge within the container 49, one being the relatively thin outer layer of impure titanium sponge, indicated by the reference numeral 51 and which is not removed from the container by the cutter 19. The remaining contents of the container 49, within the impure layer 51, is pure titanium sponge, identified by the reference numeral 52. The pure titanium sponge 52 is the raw material which is processed into the final product and which is removed from the container in the form of porous pieces.

Stresses and strains caused by repeatedly heating the container 49 with new charges deforms the container to such a degree that it is impossible to effectively secure the container directly to the ring 27. In order to secure the container 49 within the ring 27, it is secured within a holder 53 for placement within the ring 27. The holder 53 is of cylindrical configuration having an opening at one end and having a plurality of exterior reinforcing side ribs 54 which are continued along the bottom of the holder to be rigidly united at the center thereof. Within the holder 53 at its closed end there are a plurality of supporting blocks 56 on which the container 49 rests. A plurality of lugs 57 are provided at the closed end of the holder 53, corresponding in number to the supporting blocks 56 and are circumferentially disposed at points to align with the supporting block 56. Each of the lugs 57 is provided with a downwardly and inwardly extending screw threaded opening in which screws 58 are threadedly engaged to contact an exteriorly extending annular flange 59 formed on the bottom of the container. By tightening the screws 58 against the flange 59 the bottom of the container 49 is forced into tight engagement with the supporting blocks 56 to securely lock the container 49 within the holder 53, so that they operate as a unit. For axial alignment of the container 49 within the holder 53, a series of set screws 60 are threaded through the wall of the holder 53 into tight engagement with the periphery of the container 49. The set screws 60 also serve to prevent any lateral movement of the container within the holder.

The holder 53 includes a pair of spaced apart annular flanges 61 and 62 disposed at its top open end and which are provided with peripheral tapered surfaces 63 and 64 respectively. The surfaces 63 and 64 are constructed to engage a mating interior annular tapered surface 65 formed in the ring 27. The engagement of the tapered surfaces 63 and 64 of the flanges 61 and 62, respectively, with the tapered annular surface 65 of the ring 27 serves to center the holder 53 within the ring 27 as well as to provide friction engaging surfaces by which means the holder 53 will rotate with the ring 27. The annular flange 62 is the primary centering and engaging member while the flange 61 serves as an adjunct thereto, aiding in supporting the weight of the holder 53 and container 49 in the ring 27.

To facilitate the positioning of the large unwieldy holder 53 and container 49 into a work position within the ring 27, a loading mechanism is provided which is operable to position the holder with the container in the ring 27 and to return them to an unloading position after the titanium sponge has been removed from the container. To this end, a basket 66 is provided at the front end of the machine to receive the holder 53 and container 49. The basket 66 is of cylindrical configuration and constructed of a plurality of L-shaped rib members 67 which extend parallel to its axis in spaced relationship about its periphery and radially along its bottom where their converging ends are secured to a collar like bushing 68. A metal liner 69 is secured to the inner sides of the side legs of the L-shaped rib members 67 and constitutes the wall of the basket. The bottom radially disposed legs of the L-shaped rib members 67 are each provided with a plate 71 which is welded to the top surface of the leg as well as to the liner 69 and bushing collar 68 for added strength and rigidity.

Figure 2:
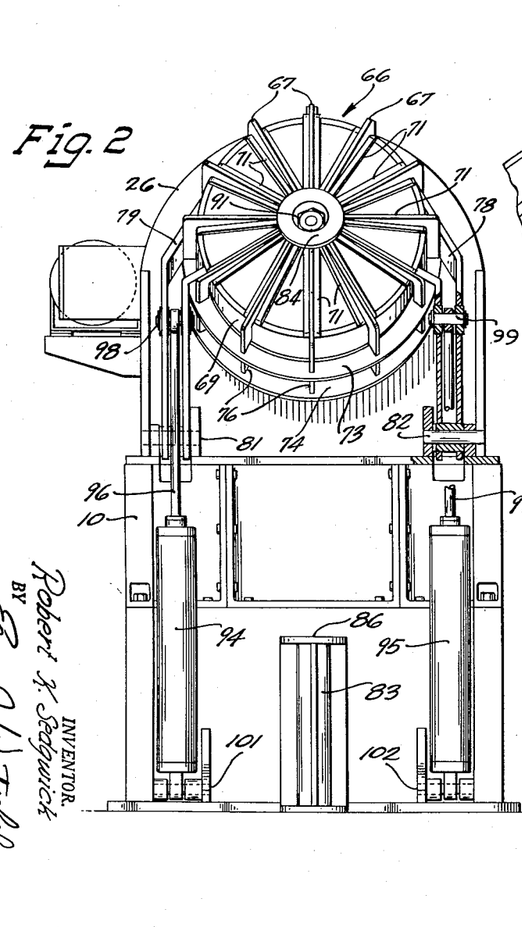
Fig. 2 is a view in front elevation of the machine tool illustrated in Fig. 1.

The top portion of the basket 66 is constructed of heavier liner 72 which is welded to the liner 69. A pair of ring members 73 and 74 encircle the liner 72 and are reinforced by a plurality of ribs 76 which are in alignment with the rib members 67. As shown in Figs. 2 and 3, the basket is a large rigid built-up structure with a reinforced wall section adjacent to its open end. A pair of arms 78 and 79 are secured to either side of the basket 66 at the heavily reinforced top portion. The opposite ends of the arms 78 and 79 respectively, are pivotally secured to the base 10 as at 81 and 82. A pedestal 83 secured to the base 10 is disposed to support the basket 66 in the loading position as indicated by the broken lines in Fig. 1. A bottom plate 84 is fixed to the bushing 68 to serve as a seat for engaging a bearing plate 86 mounted on top of the pedestal 83 so that the plate 84 rests upon the plate 86 when the basket is being supported by the pedestal 83.

The inner top portion of the bushing 68 within the basket 66, supports a thrust bearing 87 which is secured therein by an umbrella bolt 88, the stem of which extends through the collar to an enlarged bore portion 89 in the bottom of the collar 68. The extending end of the umbrella bolt 88 is provided with a threaded end portion on which is threadedly engaged a nut 91 to retain the thrust bearing 87 in place so that the bolt 88 is journalled in the bushing 68 and is retained therein by the nut 91. The head 92 of the umbrella bolt 88 serves as a bearing plate for engagement by the bottom of the holder 53 contained within the basket 66. It is evident then, that when the holder 53 is placed in the basket 66, the only physical connection between these two elements is the supporting connection on the thrust bearing 87. Therefore, the holder 53 is rotatably supported within the basket 66 and is free to move laterally therein as well as axially outwardly thereof.

The basket 66 is actuated in its path of movement by a pair of piston and cylinder mechanisms 94 and 95 which operate to move it from its vertical loading position through the horizontal plane into a downwardly facing work position and return it to its loading position when the machining operation is completed. The piston and cylinder mechanisms 94 and 95 have their piston rods 96 and 97, respectively, pivotally connected to the arms 79 and 78 by pins 98 and 99 while the cylinders are pivotally secured to the base 10 by pins 101 and 102 at their ends opposite the piston rods 96 and 97. With this arrangement, the piston and cylinder mechanisms 94 and 95 are self-adjusting to accommodate the path of travel of the basket 66 about the pivotal connecting points 81 and 82.

In operation the piston and cylinder mechanisms 94 and 95 are actuated to move the basket 66 off of the pedestal 83. As the basket moves in its path of travel about the pivotal connecting points 81 and 82, the holder 53, freely contained within the basket 66, moves of its own weight to the lower or downward side of the basket 66. As the basket 66 reaches its downwardly facing position with its open end adjacent to the ring 27, the annular flange 62 of the holder 53 is inserted within the ring 27. At this time the holder 53, of its own weight, tends to slide out of the basket 66 to move its tapered portion 64 into engagement with the tapered portion 65 of the ring 27. The complementary tapered portions of the holder 53 and the ring 27 serve to axially align the two members, and since the axis of the crucible 49 has been previously adjusted to coincide with the axis of the holder 53, the axes of the three members now coincide.

To insure positive engagement of the holder 53 with the ring 27 so that the holder will rotate with it in sealed engagement, and to insure positive retention of the basket 66 in the work position, a positive locking mechanism 105 has been provided. As best shown in Fig. 5, the locking mechanism 105 is supported on a bracket 106 secured to the housing 26 and comprises a shaft 107 having one end journalled in a bearing 108 mounted in an extending arm 109 of the bracket 106. The opposite end 111 of the shaft 107 is splined for engagement with a portion of a complementary splined bushing 112 which is rotatably supported in another extending arm 113 of the bracket 106. A collar 114 is secured to the outer surface of the arm 113 and is provided with a flange 116 upon which is mounted a hydraulic motor 117 for selectively rotating the shaft 107 in either direction.

The drive shaft of the hydraulic motor 117 extends into the collar 114 and is provided with a splined portion 118. The splined portion 118 of the hydraulic motor drive shaft is engaged with the end of the cooperating splined bushing 112 so that the bushing 112 effects an operable driving connection between the drive shaft of the hydraulic motor 117 and the shaft 107 which is in splined engagement with its opposite end. The shaft 107 is provided with an integrally formed eccentric 119 of circular configuration with its center offset from the axis of the shaft 107 and disposed between the extending arms 109 and 113 of the bracket 106. A lifter arm 121 is mounted on the shaft 107 and is disposed between the eccentric 119 and the arm 113. In order to render the lifter arm 121 rotatable with the shaft 107, the inner face of the bushing 112 is provided with two keyways 122, one of which is clearly shown in Fig. 5, which receive keys 123 integrally formed on the side of the lifter arm 121. With this arrangement, the lifter arm 121 may be selectively positioned on the shaft 107 in any desired position by resetting the engagement of the splined bushing 112 with the splined end of the drive shaft 118 and the splined end 111 of the shaft 107.

A hooked latch member 126 is mounted on the eccentric 119 of the shaft 107 and is freely rotatable thereon. The basket 66 is provided with a bracket 131 which rotatably supports a latching roller 132 over which the hook of the latch member 126 engages. To lift and retain the latch member 126 in an upright or unlocked position, the lifter arm 121 is provided with a laterally extending lug 127 which extends beyond the arcuate end of the latch member 126 but may be rotated in an arc with the lifter arm 121, to engage the bottom surface 128 of the latch 126 and lift it to an upright or unlocking position.

In operation, and as best illustrated in Fig. 6, the latch member 126 is normally disposed in an upright position as indicated by the dotted lines and identified as position "A." In this position the lifter arm 121 is disposed with the lug 127 engaging the bottom surface 128 of the latch 126 as indicated at "B" in Fig. 6 to retain the latch in the upright or unlocked position. At this time the cam portion 119 of the shaft 107 is located as at "C." When the basket 66 has been located in the work position the hydraulic motor 117 is actuated to rotate the shaft 107 in a counterclockwise direction, as viewed in Fig. 6. Upon initial counterclockwise movement of the shaft 107 the lifter arm 121 is rotated in the same direction to a position indicated at "D" allowing the latch member 126 to drop or rotate by gravity, to engage the latching roller 132 in the forward position indicated by the broken lines in Fig. 6 and identified by the letter "E." The eccentric 119 now is located towards the bottom of its circular path generally corresponding to the position "D" of the lifter arm 121. Upon further counterclockwise movement of the shaft 107 the eccentric 119 is rotated to a rearward position shown in full lines, and indicated by the letter "F." The rotating shaft 107 causes the eccentric 119 to draw its associated latch member 126 rearwardly to move it from its forward position "E" to a rearwardly position "G" indicated in full lines. With this movement, the hook portion of the latch member 126 engages the roller 132 and draws it and its associated basket 66 closer to the ring 27 but not in contact with it. With the basket 66 drawn closer to the ring 27, the thrust bearing 87 exerts a positive force upon the bottom of the holder 53 to forcefully engage its tapered nose portion 62 in the tapered portion 65 of the ring 27 to insure positive engagement of the holder 53 with the ring 27 so that these two members will rotate together. It is to be noted that the latch member 126, when in the position "E," is fully effective to lock the basket 66 in its work position adjacent to the ring 27 while the rearward movement of the latch member 126 functions to insure positive engagement of the holder 53 in the ring 27.

To release the locking mechanism 105 the hydraulic motor 117 is actuated in the opposite direction to rotate the shaft 107 and the eccentric 119 in a clockwise direction. The initial movement of the eccentric 119 in a clockwise direction operates to release the hook of the latch member 126 from tight engagement with the roller 132 and shift the latch member to the position "E." At the same time the lifter arm 121 rotates with the shaft 107 to move the lug 127 to the position "D" where it contacts the bottom surface 128 of the latch member 126. Upon further clockwise movement of the shaft 107 the lug 127 is moved to the position "B" and operates to pivot the latch member 126 with it into the upright or unlocked position "A."

From the foregoing detailed description of the locking mechanism 105, it is obvious that an effective mechanism has been provided which has a dual function of locking the basket 66 in the work position and which is also operative to insure positive engagement of the holder 53 within the ring drive 27.

As previously mentioned it may be desirable to perform the milling operation upon the titanium sponge in a sealed enclosure. As best shown in Figs. 1 and 3, the front or basket side of the ring 27, is effectively sealed by the tight engagement of the tapered flange 62 of the holder 53 with the tapered wall portion 65 of the ring 27. The opposite side or spindle side of the ring 27 is sealed by a hood 133 secured to an outwardly facing edge 134 of the roller supporting ring 29. The hood 133 is provided with windows 136, 137, 138 and 139 through which the operation of the cutter 19 may be observed. An opening 141 is formed in the hood 133 for receiving the quill 18, the opening being sealed by a bushing 142. As shown in Fig. 3, the bushing 142 bears against the quill 18, and since the latter will vibrate when the machine is in operation, a conventional floating mounting 143 is provided for the bushing 142 so that it may vibrate with the quill without interfering with the seal. The floating mounting 143 may be formed of an inner ring 143a which is secured in the opening 141 provided in the hood 133 as by welding. The seal 142 is mounted on the quill 18 by removing the cutter 19 and slipping the seal 142 about the quill. When the seal 142 has been positioned so that an annular flange portion 142a thereof is against the outer face of the inner ring 143a, an outer split ring 143b having an inwardly extending annular flange 143c is secured to the inner ring 143a by a plurality of threaded screws 143d, as is shown in Fig. 4. In this manner the flange 142a of the seal 142 is locked between the rings 143a and 143b and prevented from moving axially with the quill, but still is movable radially. Since the normal retracted position of the spindle head 16 is such that the cutter 19 will be in the position represented by the broken lines shown in Fig. 3, there is no need to disassemble the seal for normal operations. However, when the spindle head 16 is to be retracted to the tool change or service position, represented by the broken lines shown in Fig. 1, the split ring 143b is removed. Thus, when the quill 18 is retracted to withdraw the cutter 19 clear of the hood 133, the seal 142 is free to move with the quill.

The angular downwardly facing position of the crucible 49 serves to discharge the pieces formed by the cutter 19 as it operates upon the titanium sponge within the crucible 49. Since the crucible is tilted with its open end lower than its closed end, the pieces formed by the cutter 19 will fall to the wall of the crucible, and the rotational movement of the crucible will operate to move the pieces out of the crucible through its opening into the hood 133. A duct 144 is in sealed communication with the hood 133 in position to receive the particles of titanium discharged from the container 49. The particles falling into the duct 144 are directed into a hand truck 146 through a flanged opening 147 in the top of the truck. The connection between the flanged opening 147 in the truck 146 and the lower flanged end of the duct 144 is such as to provide for an air tight seal therebetween.

When connected to the duct 144, the hand truck 146 is located in a tunnel like recess 148 provided in the machine, and is guided into proper position within the recess by guide tracks 149 secured to the floor upon which the base of the machine rests. With this arrangement, the particles formed by the cutter 19 operating upon the titanium sponge conveniently fall through the duct 144 into the hand truck 146 without being exposed to the air. The truck 146 may be readily disconnected from the duct 144 by means of a hand lever 151 which actuates suitable mechanism (not shown) to break the sealed engagement between the flange 147 and the duct 144.

As previously mentioned, it may be desirable to have the cutter 19 operate upon the titanium sponge in an atmosphere of inert gas such as argon. To this end, the hand truck 146 is provided with a suitable inlet connection 152 which communicates with the interior of the truck. When the truck 146 has been positioned within the recess 148 and the sealed connection made to the duct 144, a conduit (not shown), in communication with a source of argon gas, is connected to the inlet 152 in the hand truck 146. The gas is then pumped into the truck, and, of course, will fill not only the truck, but also the duct 144 and the area enclosed by the hood 133. The argon gas being heavier than the air within the closed system, will force the air to the top of the hood 133. To exhaust the air therefrom a manually operable exhaust valve 153 is provided in the top of the hood 133, for the purpose of purging the air from the sealed system.

When all of the pure titanium sponge has been removed from the container 49, the container and its holder 53 are removed as a unit from the ring 27. This is accomplished by the action of the basket 66. As the basket 66 is pivoted in a counterclockwise direction as viewed in Fig. 3, it will start to move without the holder 53 and container 49. Upon continued movement the basket 66 will engage the holder 53 and break the tight engagement between the holder 53 and ring 27. Since the center of gravity of the holder 53 is outwardly of the ring 27, the holder 53 with the crucible 49 will fall into the basket 66 and move with it to the load position on the pedestal 83. The holder 53 and container 49, as a unit, then may be conveniently lifted out of the basket 66 by a suitable crane (not shown) and a new holder and container loaded therein. It will be understood that while the word "fall" has been used to describe the movement of the holder in respect to the basket, it is to be understood that the degree of movement of the holder, relative to the basket, is small.

In operation, assuming that the basket 66 is resting on the pedestal 83 as indicated by the broken lines in Fig. 1, and that a container 49 has been placed within the holder 53 and located and locked therein at some convenient work area, the holder and container is then placed within the basket 66 by suitable means. With the container and holder in the basket the operator, standing on the platform 12, depresses the proper switch on the control panel 154 to actuate a fluid pump (not shown) which supplies fluid pressure to the piston and cylinder mechanisms 94 and 95 to move the basket 66 to the work position illustrated in Figs. 1 and 3. The basket 66 in moving into the work position guides the flange 62 of the holder 53 into the ring 27. The holder 53 and container 49 tend to slide forwardly into the ring 27 when the basket 66 has moved into a downwardly facing position. Due to the peripherical tapered surface 64 on the flange 62 and the interior tapered annular surface in the ring 27, the holder 53 will center itself in the ring.

When the basket 66 has reached the work position, the operator depresses another switch on the control panel 154, to energize the solenoid valve (not shown) to direct fluid to the hydraulic motor 117 to actuate the locking mechanism 105 so that the basket 66 is locked in the work position and to apply a force against the bottom of the holder 53 to insure positive engagement of the holder with the ring 27. Assuming that the spindle head 16 has been previously retracted to a tool change position, represented by the broken lines shown in Fig. 1, upon completion of the locking action, the operator depresses another switch to effect movement of the spindle head 16 along the ways 14 to feed the cutter 19 into the ring 27. When the cutter 19 and quill 18 reach a position that is represented by the broken lines illustrated in Fig. 3, the operator stops the feeding movement of the head. In this position, the quill 18 is within the hood 133, and the seal 142 is then secured in position by assembling the split ring 143b in place to lock the flange 142a of the seal 142 between the rings 143a and 143b so that the space between the hood and the quill is sealed by the bushing 142. The normal operation of the spindle head 16, as previously mentioned, is from the normal retracted position, where the cutter 19 is in a position clear of the container 49 and within the hood 133, as represented by the broken lines in Fig. 3. Therefore, when the cutter 19 is in the normal retracted position, the operator, after effecting a locking of the basket 66 in the work position, is ready to charge the sealed system with the inert gas.

Thus, with the holder 53 located in the ring 27 in tight engagement therewith and the quill entered in the hood 133, the enclosure is effectively sealed off from the atmosphere. Previous to the placing of the holder 53 in the basket 66, the truck 146 has been moved into position within the tunnel 148 and the duct 144 connected thereto. Inert gas, such as argon, is now admitted into the truck through the inlet 152 until the truck, duct and hood have been charged with the gas. The air within the sealed system is moved by the heavier gas to the top of the hood 133 and the operator then opens the exhaust valve 153 to purge the air from the system.

After the system has been charged with the inert gas, the operator again depresses the proper switch to continue the feeding of the cutter into the container. At the same time, the operator depresses other switches to effect rotation of the spindle 17, and thereby the cutter 19, and to effect rotation of the ring 27 to feed the material in the container to the rotating cutter. Thus, with the rotation and feeding of the cutter upwardly into the container and with the rotation of the container the removal of the titanium sponge mass from the container is started. As the cutter operates upon the sponge, the particles of sponge produced by the cutter fall to the bottom of the container from whence it is then moved into the duct 144 to be directed into the hand truck 146.

After the entire mass of titanium sponge has been removed from the container, the feeding movement and rotational movement of the cutter and the ring 27 is stopped. At this time the truck 146 is disconnected from the duct 144 and sealed. The spindle head 16 is now retracted to withdraw the cutter 19 from within the container 49. After the spindle head 16 has been retracted to its normal retracted position, the locking mechanism 105 is actuated in clockwise direction to release and unlock the basket 66. The basket is then moved to the load position on the pedestal 83. In moving to the load position the basket 66 engages the holder 53 to disengage the holder from the ring 27 whereupon it moves with the basket to the load position. In this position the holder 53 and container 49 are removed from the basket and the machine is now ready for another operational cycle. All operational steps are controlled by an operator who is stationed on the platform 12 and views the progress of the cutting operation through viewing windows 136, 137 and 138 provided in the hood 133 as best seen in Fig. 4.

The several operating mechanisms of the machine are controlled through an electrical control circuit (not shown) which is actuated selectively through a plurality of switches mounted in a switch box 154 secured to the side of the machine within convenient reach of an operator standing on the platform 12. Other necessary switches are mounted in another switch box 156 suspended from a pendant 157 to render it movable about the machine to the most convenient position for the operator.

From the foregoing detailed description of an explanation of the operation of the exemplifying machine tool herein set forth as a practical embodiment of the present invention, it will be apparent that there has been provided an improved machine tool especially adapted for machining a solid mass of material out of a container, and capable of automatically positioning a large unwieldy crucible from a load position to a work position.

Although the illustrative embodiment of the invention has been described in considerable detail for the purpose of disclosing a practical operative structure whereby the invention may be practiced advantageously, it is to be understood that the particular apparatus described is intended to be illustrative only, and that the various novel characteristics of the invention may be incorporated in other structural forms without departing from the spirit and scope of the invention as defined in the subjoined claims.

The principles of this invention having now been fully explained in connection with the foregoing description, I hereby claim as my invention:

1. In a machine tool for machining a mass of material out of a cylindrical container the combination of a base; a ring rotatably mounted on said base; drive means connected to rotate said ring; a cutter carrying spindle rotatably mounted on the base to revolve the cutter and supported on said base for axial movement with its axis parallel to the axis of said ring but offset therefrom; means connected to rotate said spindle; means connected to effect the axial movement of said spindle; a holder adapted to receive said container in locked engagement therein; means operable to secure the container in said holder in coaxial relationship; a basket pivotally secured to said base and adapted to receive said holder in which said container is operationally disposed, actuating means operatively connected to said basket to pivot said basket to a work position and return it to a load position; locking means operable to lock said basket in a work position adjacent to but not in contact with said ring; a rotatable support carried by said basket for supporting said holder in said basket, said rotatable support being adapted to exert a force upon said holder when said basket is locked in a work position to tightly engage said holder with said ring for rotation therewith relative to the basket.

2. In a milling machine organization for milling a mass of material out of a cylindrical container; a base; a holder adapted to receive the container in locked engagement therein; means operable to secure the container with said holder in co-axial relationship; a power actuated basket connected to said base and adapted to receive said holder with the container, said basket being movable from a load position to a work position; means in said basket to rotatably support the holder and container therein; a ring rotatably carried by said base and adapted to receive said holder and said container in a work position from said basket for rotation therewith when the basket is moved to its work position; drive means connected to rotate said ring, said holder and said ring being constructed and arranged so as to be interengageable to establish a frictional connection therebetween so that said holder will rotate with said ring; a cutter carrying spindle rotatably supported by said base for axial movement with its axis parallel to the axis of said ring but offset therefrom for moving the rotating cutter into the container for operating upon the material therein, means connected to rotate said spindle; and means connected to effect axial reciprocation of said spindle.

3. In a machine tool organization for milling a mass of material out of a cylindrical container having in combination; a base; an elongated tool support movably mounted on said base; a tool on said tool support operable during forward movement to machine the mass of material out of the container, said tool support being constructed and arranged so that its axis is disposed parallel to the axis of the container but offset therefrom when the container is in a work position; a holder adapted to receive the container in locked engagement therewith; means operable to secure the container with said holder in coaxial relationship; a holder positioning means on said base movable from a load position to a work position, said holder positioning means comprising a basket adapted to receive said holder in which said container is operationally secured and having means to rotatably support said holder with the container therein; a pair of rigid arm members fixed to said basket and pivotally connected to said base; piston and cylinder actuators operably connected to move said basket when actuated; a ring rotatably supported on said base and having an inner annular tapered surface adapted to receive a complementary surface on said holder in tight sealed engagement for effecting a connection to render the holder and its associated container rotatable with it and to position the holder and said container in the desired work position for entry of said tool therein; drive means connected to rotate said ring; and means operative to lock said basket in the work position.

4. In a machine tool for machining a mass of material out of a cylindrical container having an axial opening; a base; a housing mounted on said base; a ring rotatably supported in said housing; drive means connected to rotate said ring; a removable holder adapted to receive said container; said ring having frictional means to receive and support said holder in said ring in tight engagement for rotation therewith and locate the container in its work position; means operable to secure the container with said holder in coaxial relationship; a cutter carrying spindle rotatably mounted on said base to revolve the cutter and also supported for axial movement thereon to move the cutter into the container when it is in the work position, said cutter carrying spindle being disposed on said base in a manner so that its axis is parallel to the axis of the container but offset therefrom when the container is in the work position; means connected to rotate said spindle; means connected to effect the axial movement of said spindle; a holder positioning means operable to position said holder from a load position to a work position, said holder positioning means comprising a basket adapted to freely and rotatably support said holder therein, a plurality of arm members rigidly secured to said basket and pivotally connected to said base, a fluid actuator operably connected to said base and said basket to move said basket from a load position to a work position; and locking means mounted on said housing and operatively disposed to lock said basket in a work position and to urge said basket towards said ring but not in contact with it.

5. In an apparatus for positioning and revolving a container; a base; a ring rotatably mounted on said base; drive means connected to rotate said ring; a basket pivotally secured to said base; a removable holder adapted to receive said container and to be freely contained in said basket, said holder being constructed and arranged to be engageable with said ring for rotation therewith; means to rotatably support said holder with the container in said basket; said ring being provided with an inner annular tapered surface to receive said holder for rotation therewith and to axially align said holder with said ring; locking means operably connected to lock the container in said holder; actuating means operably connected to said basket to move said basket from a load position to a work position adjacent to said ring in such manner that said holder and said container are deposited as a unit into axial aligned engagement with said ring for rotation therewith; and means operably connected to lock said basket in the work position but not in contact with said ring.

6. In apparatus for positioning and revolving a container; a base; a housing mounted on said base and having an opening; a ring rotatably supported in said housing and presenting an inner annular tapered surface; drive means connected to rotate said ring; a movable basket pivotally secured to said base; a removable holder adapted to receive said container in locked engagement therein, said holder being freely contained in said basket and presenting an annular tapered surface adjacent its open end for mating with the tapered annular surface of said ring to position and tightly engage said holder in centered relationship in said ring for rotation therewith; means operable to secure the container in said holder in coaxial relationship; a rotatable support in said basket to support said holder and container; a fluid actuator operably connected to pivot the basket with the holder and container therein into a position to move the holder and container as a unit to a work position so that the annular tapered surface of said holder will mate with the annular tapered surface of said ring in tight engagement therein for rotation therewith; and means operable to lock the basket in the work position but not in contact with said ring so that said rotatable support in said basket exerts a force upon said holder to maintain it in position in said ring without interfering with the rotation of the holder relative to the basket.

7. In a machine tool for machining a mass of material out of a cylindrical container; a base; a housing mounted on said base and having an opening therethrough; a ring rotatably supported in said housing and having an inner annular tapered surface; a drive means connected to rotate said ring; a removable holder adapted to receive said container in locked engagement therewith, said holder presenting an annular tapered end surface for engagement with the inner annular tapered surface of said ring to position and secure said holder in centered relationship in the ring for rotation therewith; means operable to secure the container in said holder in coaxial relationship; a basket pivotally secured to said base and adapted to freely receive said holder therein; means operable to rotatably support said holder with the container in said basket; a piston and cylinder actuator for moving said basket into a work position adjacent to said ring to deposit said holder in said ring, said piston and cylinder actuator having one end pivotally secured to said base and its opposite end pivotally secured to said basket; a cutter carrying spindle rotatably mounted on the base to revolve the cutter, said spindle being also supported on said base for axial movement to move the cutter into the container when said holder and said container have been deposited in the ring, the arrangement being such that the axis of the spindle is parallel to the axis of said ring but offset therefrom; means connected to rotate said spindle; and means connected to reciprocate said spindle.

8. In a machine tool for machining a mass of material out of a cylindrical container; a base; a cutter carrying spindle rotatably mounted on the base to revolve the cutter, said spindle also being supported on said base for axial movement; means connected to rotate said spindle; means connected to reciprocate said spindle; a housing mounted on said base and having an axial opening through which said spindle is movable; a ring rotatably supported in said housing and having an inner annular tapered wall surface, said ring being disposed so that its axis is parallel to the axis of said spindle but offset therefrom; drive means connected to rotate said ring; a basket pivotally secured to said base and movable from a load position to a work position; a fluid actuator pivotally secured to said base and said basket and operable to move said basket to a work position adjacent to said ring; a holder having one end thereof open and adapted to receive said container, said holder having an annular tapered surface adjacent its open end to mate with the annular tapered surface of said ring in tight driving engagement for rotation with the ring in centered relationship; means on said holder operable to lock said container within said holder in axial alignment; rotatable supporting means in said basket to support said holder in said basket for rotation relative to the basket; a hood secured to said housing and operable to seal the spindle side of said housing; means operable to charge said sealed enclosure with an inert gas; and a valve operably connected to said hood to permit the purging of the atmosphere contained therein when said enclosure is charged with the inert gas.

9. In a loading and positioning mechanism for a machine tool adapted to remove material from a container and having a base and a cutter carrying spindle rotatably mounted on said base and also supported thereon for axial movement; a ring rotatably mounted on said base; drive means connected to rotate said ring, said ring having an inner tapered annular wall surface; a basket pivotally secured to said base; a holder adapted to be freely contained within said basket, said holder adapted to receive the container having a mass of material therein and being provided with a tapered annular surface to mate with the tapered annular wall surface of said ring to thereby effect a frictional engagement of said holder with said ring in centered relationship for rotation therewith; means to secure the container in said holder in coaxial relationship; a rotatable support in said basket for supporting said holder therein; fluid actuators pivotally connected to said base and said basket and operable to pivot said basket from a load position to a work position to deposit said holder and container as a unit within said ring; and means operable to lock said basket in said work position and adapted to exert a force upon said basket to effect a thrust force upon said holder through said rotatable support whereby said holder is positioned with its tapered annular surface in driving engagement within the tapered annular surface of said ring for rotation therewith.

10. In a container handling device for a machine tool having a base and a cutter carrying spindle rotatably and axially movably supported on said base; a ring rotatably supported on said base and having an axial opening through which said cutter carrying spindle is movable, said ring being provided with an inner tapered annular wall surface; drive means connected to rotate said ring; a basket; a pair of arms secured to said basket and having their free ends pivotally secured to said base to render said basket movable relative to the base; a motion producing actuator pivotally secured to said base and said basket to actuate the basket in its path of movement from a load position to a work position and return; a support on said base for supporting said basket in its load position; a container holder adapted to be loosely contained within said basket, said holder having a tapered annular surface to mate with the inner tapered annular wall surface in said ring; means in said holder operative to secure said container in said holder in axial alignment therein; and means in said basket to rotatably support said holder in said basket and operable to exert a force on said holder to effect a driving engagement between its tapered surface and the cooperating tapered surface on said ring when said basket has been moved to its work position.

11. In a machine tool for machining a mass of material out of a cylindrical container; a base; a housing mounted on said base and having an opening; a cutter carrying spindle rotatably mounted on said base and supported on said base for axial movement with its axis parallel to the axis of the opening in said housing but offset therefrom; means connected to rotate said spindle; means connected to reciprocate said spindle; a ring rotatably supported in said housing with its axis aligned with the axis of the opening in said housing, said ring having an internal annular tapered wall surface; drive means connected to rotate said ring; a basket pivotally mounted on said base and movable to a work position with its opening facing said ring; a holder for said container, said holder being provided with an external annular tapered nose portion adapted to mate with the internal tapered wall surface of said ring to thereby effect a frictional engagement therebetween to enable said holder to rotate with said ring in centered relationship, said holder being adapted to be loosely supported within said basket; means in said holder operable to secure said container in axial alignment therein; a rotatable support in said basket to support said holder; locking means mounted on said housing and operably disposed to engage said basket to lock it in its work position adjacent to said ring, said locking means also being operable to effect a pulling force on said basket toward said ring thereby exerting a force upon said holder through said rotatable support to positively engage said holder with said ring in tight engagement therewith.

12. In a machine tool for machining a mass of material out of a cylindrical container; a base; a cutter carrying spindle rotatably mounted on said base to rotate said cutter and supported on said base for axial movement; means connected to rotate said spindle; means connected to reciprocate said spindle; a ring rotatably mounted on said base adjacent to the cutter supporting end of said spindle with its axis parallel to but offset from the axis of said spindle, said ring having an inner annular tapered wall portion; drive means connected to rotate said ring; a holder adapted to receive said container and having an annular tapered surface adapted to mate with the tapered wall portion of said ring for tight frictional engagement therewith in centered relationship; means carried by said holder and operable to lock said container within it in axial alignment; a basket pivotally connected to said base and movable from a load position to a work position with its opening facing said ring, said basket being adapted to receive said holder and said container as a unit in a manner that said holder is freely and rotatably contained therein and has limited lateral movement therein; and a fluid actuator pivotally connected to said basket and said base and operable to exert a straight line force on said basket to move it in its path of travel from its load position to its work position and return; whereby when said basket is being moved to the work position said holder will move of its own weight to the lower side of said basket and when said basket has reached the work position adjacent to said ring said holder will be guided into said ring and will slide into mating engagement therewith to position itself in axial alignment with said ring for rotation therewith and when said basket is actuated to its load position the wall surface of said basket will engage said holder to withdraw it from said ring.

13. In a machine tool for machining a mass of material out of a cylindrical container; a base; a housing mounted on said base and having an opening therethrough; a cutter carrying spindle rotatably mounted on said base and supported on said base for axial movement for moving the cutter through the opening in said housing; means connected to rotate said spindle; means connected to reciprocate said spindle; a pair of annular roller supports secured to the opposite faces of said housing and concentric with the opening therein, said roller supports each having a plurality of circumferentially spaced rollers therein, the rollers in each roller support being inclined at an angle of 45° from the axis of the opening in said housing and the rollers in each roller support being inclined 90° from the roller of the opposite support; a ring having an inner annular tapered wall surface and rotatably supported by said rollers with its axis parallel to but offset from the axis of said spindle, said ring having a pair of peripheral grooves which are V-shaped in cross-section in which said rollers are engaged to rotatably support the ring and to prevent axial movement of said ring; means operably carried by said ring to rotate it; a holder having an annular tapered nose portion for mating with the annular tapered wall surface of said ring to effect a tight engagement of said holder with said ring so that said holder will rotate with said ring in centered relationship, said holder being adapted to receive said container; operable means in said holder to secure said container within said holder in axial alignment; a basket adapted to receive said holder pivotally mounted on said base and movable from a load position to a work position adjacent to said ring; a rotatable support in said basket to support said holder therein; said basket being so arranged and constructed as to guide said holder into said ring when in a work position; fluid actuated means pivotally secured to said base and to said basket to actuate said basket in its path of travel; and locking means on said housing operable to engage said basket when in a work position to lock said basket in the work position and also operable to move said basket toward said ring to exert a force upon said holder through said rotatable supporting means to tightly engage said holder in said ring for rotation therewith.

14. In a milling machine for machining a mass of material out of a cylindrical container; a base; a housing mounted on said base; a ring rotatably supported in said housing; a holder for said container; means to secure the container in said holder in coaxial relationship; a basket pivotally secured to said base and adapted to receive said holder; means operable in said basket to rotatably support said holder with the container therein; fluid power means carried by said base and operably connected to move said basket from a load position to a work position with its open end facing said ring; an inner annular tapered surface in said ring adapted to receive said holder in tight frictional engagement so that said holder will rotate with said ring and be centered therewith; locking means secured to said housing and operably disposed to engage said basket when actuated to lock said basket in the work position, said locking means being also operable to exert a pulling force on said basket to draw it closer to said ring but not in contact therewith; a source of power carried on said housing and operably connected to actuate said locking means; and a source of power carried on said base and operably connected to rotate said ring.

15. In a machine tool for milling a mass of material out of a cylindrical container; a base; a ring rotatably supported on said base; drive means connected to rotate said ring; a holder adapted to receive said container, said holder being constructed and arranged to be frictionally engageable with said ring for effecting a driving connection therebetween, said ring having an inner annular tapered surface adapted to receive and support said holder in frictional engagement for rotation with it and to center said holder in said ring; means operable to secure the container in said holder in coaxial relationship; a basket pivotally secured to said base and adapted to receive and rotatably support said holder therein, said basket being movable from a load position to a work position adjacent to said ring for inserting said holder within said ring; locking means carried by said base to lock said basket in the work position and to draw said basket towards said ring to effect the frictional driving engagement between the holder and the ring; said locking means comprising a shaft; an eccentric on said shaft; a latch member mounted on said eccentric for independent rotation thereon; a lifter arm mounted on said shaft for rotation with it and constructed and arranged to engage said latch member; and means operably connected to rotate said shaft in both directions selectively; whereby when said shaft is rotated in one direction said lifter arm is rotated to permit the latch member to rotate on said eccentric to engage said basket to lock it in the work position and upon further rotation of said shaft the eccentric cam portion on said shaft exerts a force upon said latch member to move it rearwardly thereby drawing said basket towards said ring to positively engage said holder with said ring.

16. In a machine tool for machining a mass of material out of a cylindrical container; a base; a holder adapted to receive said container; means operable to secure the container within said holder; a cutter carrying spindle rotatably mounted on said base and supported thereon for axial movement; means connected to rotate said spindle; means connected to reciprocate said spindle; a holder and container rotating means rotatably mounted on said base, said rotating means being provided with an opening the axis of which is disposed parallel to but offset from the axis of said spindle, said rotating means having an inner annular tapered surface for receiving said holder in predetermined position relative to the axis of the opening in said rotating means; drive means connected to rotate said rotating means; a holder and container positioning means movably mounted on said base and adapted to guide the container into driving engagement with said rotating means; means operable to effect a supporting and driving engagement of said holder with the inner annular tapered surface of said rotating means; a support on said positioning means adapted to rotatably support said holder and the container therein; and locking means engageable with said positioning means and operable to urge said positioning means closer to said rotating means but not in contact with it to retain said holder in said rotating means for a driving engagement therewith.

17. In a machine tool for machining a mass of material out of a cylindrical container the combination of a base; a ring rotatably supported on said base; coupling means securable to the container and operable to couple the container to said ring in concentric relationship therewith so that the container will rotate with said ring; drive means connected to rotate said ring; a cutter carrying spindle rotatably supported by said base and axially movable relative to it with its axis parallel to the axis of said ring but offset therefrom; means connected to rotate said spindle; means connected to effect the axial movement of said spindle; a basket pivotally secured to said base and adapted to receive said coupling means and the container in a load position; means in said basket to rotatably support said coupling means and the container; means operative to move said basket with said coupling means and the container to a work position to insert said coupling means and the container in said ring; and means operable to operably engage said coupling means with said ring to couple the container to said ring so that the container will be supported by said ring for rotation with it in concentric relationship.

References Cited in the file of this patent
UNITED STATES PATENTS

| | | |
|---|---|---|
| 453,004 | Hix | May 26, 1891 |
| 1,220,827 | Downs | Mar. 27, 1917 |
| 2,260,697 | Allen | Oct. 28, 1941 |
| 2,272,219 | McCoy | Feb. 10, 1942 |
| 2,380,808 | Tyson | July 31, 1945 |
| 2,442,595 | Frunk | June 1, 1948 |